United States Patent [19]

Kawai et al.

[11] 4,365,565
[45] Dec. 28, 1982

[54] CONTROL APPARATUS FOR AUTOMATIC EMBROIDERY SEWING MACHINE

[75] Inventors: Taneichi Kawai; Koji Nishida, both of Anjo; Osamu Miyake, Toyota; Shigemitsu Hamajima, Oobu, all of Japan

[73] Assignee: Aisin Seiki Kabushiki Kaisha, Aichi, Japan

[21] Appl. No.: 204,052

[22] Filed: Nov. 4, 1980

[30] Foreign Application Priority Data

Nov. 7, 1979 [JP] Japan .................................. 54-144899
Nov. 29, 1979 [JP] Japan .................................. 54-165288

[51] Int. Cl.³ .......................... D05C 9/06; D05B 21/00
[52] U.S. Cl. ................................. 112/103; 112/121.12
[58] Field of Search ................... 112/121.12, 121.11, 112/102, 103, 275, 277, 86, 90

[56] References Cited

U.S. PATENT DOCUMENTS

| | | | |
|---|---|---|---|
| 4,108,090 | 8/1978 | Landau, Jr. et al. | 112/121.11 |
| 4,133,275 | 1/1979 | Herzer et al. | 112/121.12 |
| 4,254,724 | 3/1981 | Conrads | 112/121.11 X |
| 4,280,420 | 7/1981 | Nishida et al. | 112/103 |
| 4,309,950 | 1/1982 | Franklin | 112/103 |

*Primary Examiner*—Peter P. Nerbun

*Attorney, Agent, or Firm*—Oblon, Fisher, Spivak, McClelland & Maier

[57] ABSTRACT

A control apparatus for the embroidery sewing machine which comprises at least two D.C. servomotors for providing controlled power output for driving an embroidery frame, one pair of sensors responsive to rotation of the servomotors for providing detect signals in the form of feedback signals, a presettable counter located at pre-stage to a servomotor drive output amplifier circuit and having an input of the feedback signals in the form of up/down signals, the presettable counter containing a preset value for one stitch operation and counting up or down toward making the preset value zero according to the feedback signal resulting in a residual value if the servomotors are incompletely actuated, and correcting means for superposing the residual value in the counter with a value to be set therein for the next succeeding stitch operation, whereby integral accumulation of errors due to incomplete actuation of each servomotor for each stitch operation can be effectively eliminated. The control apparatus further includes indicator elements which tell the appropriate operation in progress and the completion thereof, and control keys which permit a repetitive operation including a return and an advance, a stop, etc. as required.

18 Claims, 12 Drawing Figures

FIG. 8

| ORDINARY EMBROIDERY | | | APPLIQUÉ EMBROIDERY | | |
|---|---|---|---|---|---|
| NO | DATA (HEXA) | | NO | DATA (HEXA) | |
| 0 | 8A | UNDER-FABRIC SETTING | 0 | 8B | APPLIQUÉ FABRIC SETTING |
| 1 | E0 | NUMERICAL CONTROL DATA | 1 | E0 | NUMERICAL CONTROL DATA |
| 2 | 00 | X-AXIS TRAVEL DATA | 2 | 00 | X-AXIS TRAVEL DATA |
| 3 | 00 | Y-AXIS TRAVEL DATA | 3 | 00 | Y-AXIS TRAVEL DATA |
| 4 | A0 | NUMERICAL CONTROL DATA | 4 | A0 | NUMERICAL CONTROL DATA |
| 5 | 06 | X-AXIS TRAVEL DATA | 5 | 06 | X-AXIS TRAVEL DATA |
| 6 | 12 | Y-AXIS TRAVEL DATA | 6 | 12 | Y-AXIS TRAVEL DATA |
| 7 | 80 | NUMERICAL CONTROL DATA | 7 | 80 | NUMERICAL CONTROL DATA |
| 8 | 12 | X-AXIS TRAVEL DATA | 8 | 12 | X-AXIS TRAVEL DATA |
| 9 | 05 | Y-AXIS TRAVEL DATA | 9 | 05 | Y-AXIS TRAVEL DATA |
| ⋮ | ⋮ | ⋮ | ⋮ | ⋮ | ⋮ |
| | | | m | 8A | UNDER-FABRIC SETTING |
| ℓ | 85 | THREAD CHANGE | ⋮ | ⋮ | ⋮ |
| ⋮ | ⋮ | ⋮ | o | 88 | APPLIQUE SETTING |
| | | | ⋮ | ⋮ | ⋮ |
| | | | p | 85 | THREAD CHANGE |
| | | | ⋮ | ⋮ | ⋮ |
| u | 87 | END OF ALL DATA | u | 87 | END OF ALL DATA |

CONTROL APPARATUS FOR AUTOMATIC EMBROIDERY SEWING MACHINE

BACKGROUND OF THE INVENTION

1. Field of the Invention

The present invention relates generally to a control apparatus for the automatic embroidery sewing machine, and more particularly to an improvement in and to the control system for use in the embroidering sewing machine which provides control facilities permitting the automatic embroidering operations to be continued finally to reproduce an exact copy as a whole of a selected embroidery design or figure on a fabric ground. The control facilities are provided such that if the driving mechanism for supporting and moving the frame which carries a fabric ground to be embroidered does not cause the frame actually to be moved in a quantity of travel equivalent to the controlled quantity represented by an output signal from the control system for each stitch operation provided by the sewing machine, the difference between the actual travel and controlled travel quantities is added for correction to a controlled quantity of travel for the next succeeding stitch operation, thereby making the original design as a whole exactly to be copied on the fabric ground.

2. Description of the Prior Art

In a typical embroidery sewing machine known in the prior art, two servomotors are controlled in accordance with a programmed control data sequence which represents quantities of travel in x- and y-axis directions for the driving mechanism which supports and drives a cloth carrying frame to travel in accordance with the programmed design. The control data program is stored in the memory element in the control circuitry arrangement, and controls the two servomotors to provide their respective output powers which are combined into a plane pattern representing a resultant composed motion of x and y co-ordinate component motions. Thus, the driving mechanism is moved in accordance with the plane pattern in synchronized relationships with each up and down movement of a needle for each stitching operation provided by the sewing machine, so that the cloth frame carried and driven by the driving mechanism can be continually moved following a programmed plane pattern path.

In the prior art sewing machine, if a D.C. servomotor is employed as a power source for the frame driving mechanism, and is operated by feedback control signals provided by the control circuitry, the driving torque supplied by the servomotor may often be attenuated to be equal to the load near the end of each stitch control operation. Therefore, the servomotor may still remain on rotation until completion of the quantity of travel equivalent to the controlled quantity of travel for the appropriate stitch operation, and in this state may receive a new stitch timing which permits the frame to be driven for the next stitch operation. This may be a sort of malfunction or incomplete operation of the servomotor, and if the frame driving operations are continued by such servomotor in this situation in accordance with the programmed control data read out from the memory element, the thus obtained product carries an irregularly deformed copy of the desired original pattern.

Another typical embroidery sewing machine is known in the prior art, which provides indicator means which permits an applique needle work as well as ordinary embroidery needle work. This sewing machine provides automatic embroidery control functions which are performed in accordance with a programmed embroidery control data sequence stored in memory through the appropriate data entry means, so that the driving mechanism for supporting and driving the fabric ground carrying frame can be operated under program control. In this prior art sewing machine, an applique needle work can be performed in accordance with a control data sequence which is specifically programmed to meet the applique working requirements. However, the sewing machine provides no switching capabilities between the applique attachement cloth needle work and the fabric ground embroidering work. This may require a careful attention on the part of the machine operator on switching to another operation, in order to ensure that the machine can be properly arrested temporarily.

When the switching is desired during the execution of a series of the programmed operations, the operator cannot know the content of a next step to be performed within the control program until the step is actually executed to cause the machine operation to be resumed. For this reason, the operator wonders at all times whether the control program sequence coincides with the actual operating sequence controlled by the program.

OBJECTS OF THE INVENTION

It is therefore one object of the present invention to provide a novel and improved control apparatus in the automatic embroidery sewing machine which can effectively eliminate the above-mentioned problems of the prior art.

It is another object of the present invention to provide a control system which, if there arises any deviation of an actual position assumed by the embroidery frame on the completion of one stitch operation from the position designated by the corresponding control data in the memory, can correct it by superposing the next stitch control data with the deviation when the frame is operated for the next succeeding stitch operation.

Still another object of the present invention is to provide a control system which detects such deviation before starting to operate the frame for the next stitch operation and corrects the deviations of actual x- and y-axis travel from the corresponding previously programmed quantities of x- and y-axis travel for the next stitch operation to compensate for such deviations.

A further object of the present invention is to provide a control system which provides a means of indicating the content of a next control program step to be executed.

A further object is to provide a control system which includes means to permit the operator to issue an operating instruction in accordance with the indicated content of each next program step to be executed.

It is a still further object of the present invention to provide a control system which provides both ordinary sewing and applique needle working functions.

SUMMARY OF THE INVENTION

In one embodied form of the present invention, two D.C. servomotors are employed as servomotors driving the embroidery frame, rather than motors such as pulse motors, since the D.C. servomotor of a relatively small size can provide a great driving power output and permits a simplified drive power amplifier circuit to be employed. A feedback signal is derived from each rotation of the servomotor, and is fed in the form of up and down signals to a presettable counter or register at a prestage to the amplifier circuit. The counter contains a pre-set value, and when the input to the counter represents a forward rotation value with respect to the pre-set value, the input value is counted down toward making the result zero. When the input to the counter represents a reverse value with respect to the pre-set value, the input value is counted up toward making the result zero. Thus, the counter contains a residual value stored therein, and at a new stitch operation timing, a new input is supplied to the counter which superposes the previous residual value on the new input value to provide a corrected or compensated output value.

This register counting operation prevents accumulated errors from occurring, thus permitting an exact copy of the original embroidery pattern to be transferred to the fabric without causing any deformation in the pattern as described in the prior art description.

In another embodied form of the present invention, a programming system is provided to contain programs for the applique needle work, which are organized to provide an automatic machine stop function when a switching is desired from one kind of needle work to another, and also provide signals indicative of the content of a next succeeding step of the selected needle work. The operator panel or console on the sewing machine contains a group of indicators which visually provides the content of the next step of the selected needle work. Also, the console contains controls through which instructions are issued to the machine in accordance with the content presented on the indicators so that the same operation can be repeated or the subsequent operations can be continued sequentially.

For controling applique-sewing, not only sewing an attachment cloth on the spanned base fabric ground or base cloth but foregoing steps preceeding thereto may be provided in this embodiment, i.e., an attachment cloth pattern being drawn out on a cloth through an outline-sewing, such pattern being then cut out and prepared for the comming step. This embodiment further enables to stop the stitching on the base cloth at a position where the cut out pattern is to be sewed on and to sew the attachment cloth pattern on the base cloth fittingly superposed thereto. Each of those steps, i.e., a control step of the outline-sewing for the attachment cloth pattern, and also that of embroidery sewing may be repeated by repeatedly operating the operating means aforementioned.

BRIEF DESCRIPTION OF THE DRAWINGS

Those and other objects and features of the present invention will become apparent from the description which follows hereinafter with reference to several preferred embodiments shown in the accompanying drawings, in which:

FIG. 8 is a chart showing an organization of a sequence of control data utilized according to the present invention.

DETAILED DESCRIPTION OF THE PREFERRED EMBODIMENTS

Figure 1:
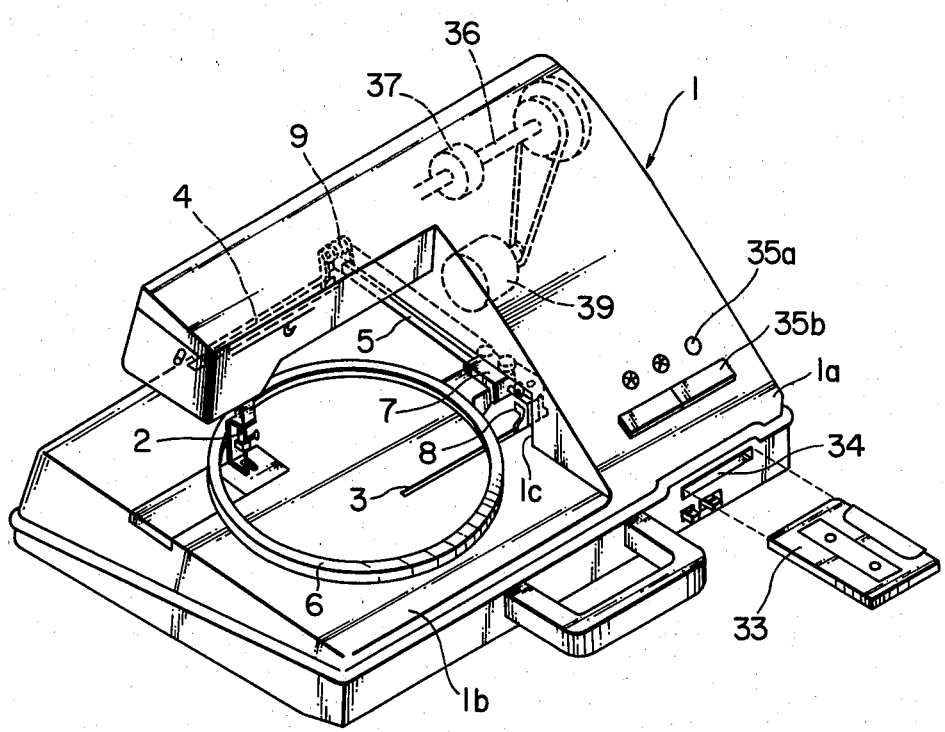
FIG. 1 is a perspective view of an automatic embroidery sewing machine to incorporate a control system in any of the preferred embodied forms of the present invention.
Figure 2:
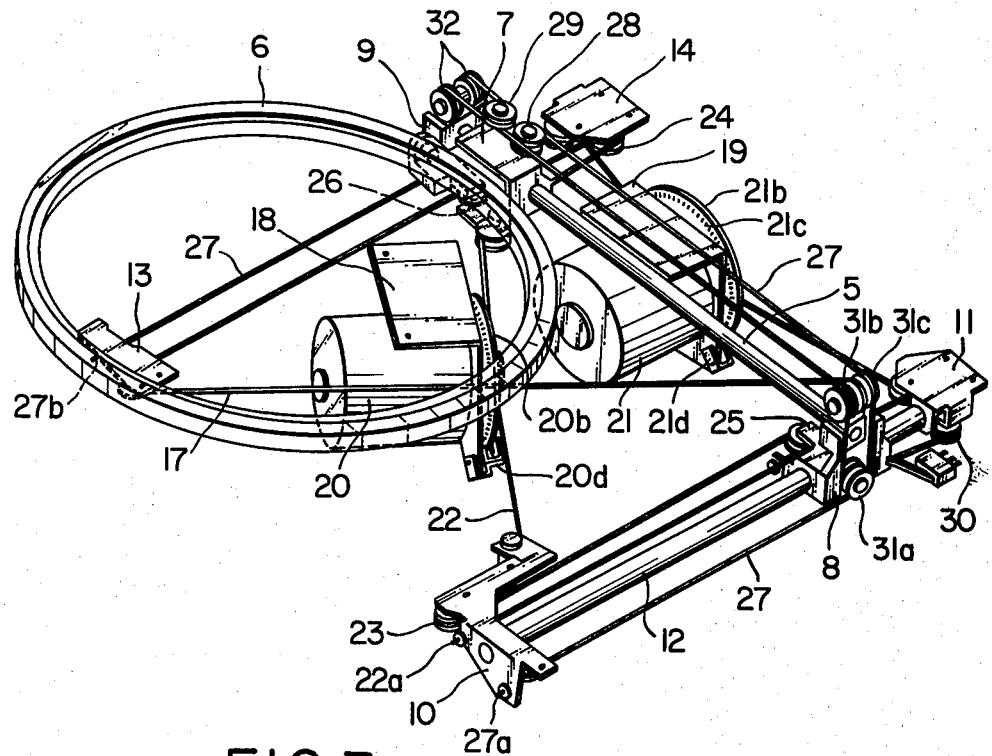
FIG. 2 is a perspective view, on an enlarged scale, of a main mechanical portion in the sewing machine.
Figure 3:
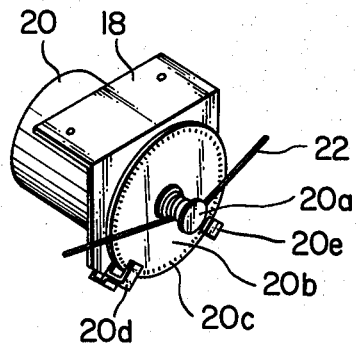
FIG. 3 is a perspective view of an element in the mechanical portion of FIG. 2 viewed from a different angle.

In advance to the description of the embodiments of the present invention, the construction of the driving mechanism which drivingly supports an embroidery frame carrying a fabric is first briefly described for better understanding the features of the present invention. Referring first to FIG. 1, a sewing machine generally designated by 1 is shown which provides an usual sewing functions. The sewing machine construction 1 includes an operator panel or console 1a located at the front lower side of an overhanging arm, the console 1a containing therein a control circuitry whose arrangement is later to be described in detail. Briefly described, the control circuitry is arranged to include a memory element for storing a programmed control data sequence which is read into memory from appropriate data recording media, and to control two servomotors located inside a machine bed 1b in accordance with thus stored control program data so that the embroidery frame 6 usually in the form of a ring as shown and movably located on the surface of the bed 1b can travel under control of the two servomotors to follow the programmed pattern path in a horizontal plane for each stitching operation provided by the machine 1 in synchronism with the up and down movement of a needle 2. The path which the frame follows on a horizontal plane according to a given pattern travels on X-Y rectangular co-ordinate. The machine bed 1b on which the frame 6 is supported carries two parallel slits 3 and 4 extending laterally. Above the bed 1b, a y-axis guide rod 5 extends perpendicularly to the slits 3 and 4, bridging across the slits 3 and 4. The guide rod 5 is driven by the driving mechanism inside the bed 1b so that the rod 5 can travel laterally along the slits 3 and 4 with its position held perpendicular with respect to the slits 3 and 4. The driving mechanism also drives a traveller 7 which is slidably mounted on the y-axis guide rod 5. The traveller 7 is driven to travel along the y-axis guide rod 5, and supports the frame 6 which is removably mounted to the traveller 7 by means of an appropriate attaching device (not shown). The y-axis guide rod 5 has front-side and rear-side carriers 8 and 9 whose lower ends extend through the respective slits 3 and 4 into the interior of the bed 1b in which the lower ends are supported for lateral sliding movement. A casing formed integrally with the overhanging arm contains the control circuit, and has a recessed portion 1c or pocket in the wall thereof located on the side nearer to the bed 1b, the pocket 1c being capable of accommodating therein the assembly consisting of the carriers 8 and 9, y-axis guide rod 5 supported by the carriers and traveller 7. As particularly shown in FIG. 1, the right-hand ends of the slits 3 and 4 extend deeply into the pocket 1c permitting the carriers 8 and 9 to be guided into the pocket 1c. The details of the X-Y rectangular-coordinate type driving mechanism contained in the bed 1b are shown in FIGS. 2 and 3. This arrangement is disclosed in the earlier U.S. Patent Application Ser. No. 139,040 filed on Apr. 10, 1980, now U.S. Pat. No. 4,280,420, in the name of the present inventor. As the features of the above earlier disclosed invention do not fall within the scope of the present invention, a summary of the arrangement is given simply to aid in understanding the general construction in conjunction with the present invention. The driving mechanism comprises two brackets 10 and 11 placed in a fixed position inside the machine bed 1b on the front right- and left-hand sides, the two brackets supporting an x-axis guide rod 12 whose opposite ends are securely held by the brackets. The front-side carrier 8 is slidably mounted on the x-axis guide rod 12, travelling along the length of the guide rod 12. A means is provided for permitting the front and rear carriers 8 and 9 to cause the y-axis guide rod 5 to travel in linkage therewith, the y-axis guide rod 5 traveling with its posture held perpendicular with respect to the x-axis guide rod 12. More specifically, two rear brackets 13 and 14 are provided at opposite sides under the rear slit 4 inside the machine bed 1b. Each of the rear brackets 13 and 11 carries a pivotted idler roll 15 and 16 on which a link wire 17 is threaded and the opposite ends of the wire 17 is connected with the respective carriers 8 and 9, forming a Z-shape connection between the idler rolls and the carriers. Thus, giving a pulling force to either of the carriers 8 and 9 causes both carriers to travel in the same direction. Within a space defined by the surrounding four brackets (front, rear, left and right), two motor brackets 18 and 19 are fixed in the bed 1b, each supporting an x-axis drive servomotor 20 and a y-axis drive servomotor 21. The x-axis drive servomotor 20 has an output shaft on which a capstan roll 20a is mounted. The capstan roll 20a carries an x-axis drive wire 22, one end 22a of which is secured on the front right-hand bracket 10 and the other end is secured on the rear right-hand bracket 14. The idler rolls 23 and 24 provided on the brackets 10 and 14 serve as one set of stationary sliding block and the idler rolls 25 and 26 provided on the carriers 8 and 9 serve as the other set of movable slider block. The two sets of the slider blocks act in opposite directions with respect to each other, and the opposite ends of a wire driving the two blocks are connected with each other at the x-axis capstan roll 20a. When the x-axis servomotor 20 is energized to provide a pull force to pull either side of the run of the x-axis drive wire 22, the front and rear carriers to which the movable block is fixed as hereinabove described are given a pull force, respectively, so that the front carrier 8 is brought closer to the front left-hand bracket 10 and the rear carrier 9 is brought closer to the rear right-hand bracket 14. Thus, the front rear link wire 17 acts to cause the x-axis guide rod 5 to travel laterally with the opposite ends thereof being maintained parallel with each other. The traveller 7 which is driven by the y-axis servomotor 21 travels along the length of the y-axis guide rod 5 is operated similarly. In this case, however, moving idler rolls 28 and 29 equivalent to the movable slider block are provided parallelly on the traveller 7 in the course of the y-axis drive wire 7, and idler rolls equivalent to the stationary block includes an idler roll 30 pivotted to the front right-hand bracket 11 and an idler roll (not shown) guidably supported by the rear right-hand bracket 14. The opposite ends 27a and 27b of the y-axis drive wire 27 are fixed to the respective front left-hand bracket 10 and rear left-hand bracket 13. In the course of the wire path in the direction of the y-axis, the y-axis guide rod 5 is allowed to travel laterally without causing the traveller 7 to slide transversally or between the front and rear sides. Each of the carriers 8 and 9 has four guide rolls 31a to 31c (31d not shown behind 31a) and guide roll 32. When either run of the y-axis drive wire is pulled, those guide rolls are operated for causing the traveller 7 to be suspended in a direction perpendicular to the portion of the wire parallel to the x-axis direction and for causing the wire to rise through the slits 3 and 4 and appear out of the bed 1b. Thus, the traveller 7 is allowed to travel laterally. For example, when only the x-axis drive wire 17 is given a pull force with the y-axis servomotor 21 at rest, the moving idlers 28 and 29 turns on the traveller 7 but do not slide transversely. Therefore, the motion components of the two co-ordinates are not restricted by each other. As a result, the embroidery frame 6 can be moved by a resultant composed motion of the two motion components to draw a locus of a plane pattern. For each stitching operation performed by the sewing machine 1 and during a semi-cycle period in which the needle ascends away from the fabric, the x-axis and y-axis drive servomotors 20 and 21 are controlled for rotation in accordance with the programmed control data sequence which contains the program steps to represent the corresponding stitches. In this manner, the embroidering needle work proceeds.

As shown in FIG. 3, the servomotors 20 and 21 which provide a plane plotting pattern motion based on the x and y rectangular-coordinates as described above have code discs 20b and 21b, respectively, which rotate together with the respective capstans. The code discs 20b and 21b have slits 20c and 21c provided at a regular angle along the outer peripheris of the discs. Two pairs of photoelectric sensors 20d, 20e and 21d, 21e are provided on the respective brackets 18 and 19 of the servomotors, and detect number of displacements (crossing) of the slits 20c and 21c caused by the code discs 20b and 21b. The two sensor pairs 20d, 20e and 21d, 21b are physically arranged in relation to the corresponding code discs 20b and 21b such that the two sensors in each pair respond to the displacements of the slits 20c and 21c to provide two detect signals having a phase lag of 90° with respect to each other. This phase relationship in the two detect signals will be described in conjunction with the circuitry arrangement later to be described. Each pair of the sensors which provides 90° out-of-phase signals is intended to convert the detected rotation angle and sense of the servomotor (20, 21) into digital feedback signals. This per se is well known in the prior art.

Figure 4:
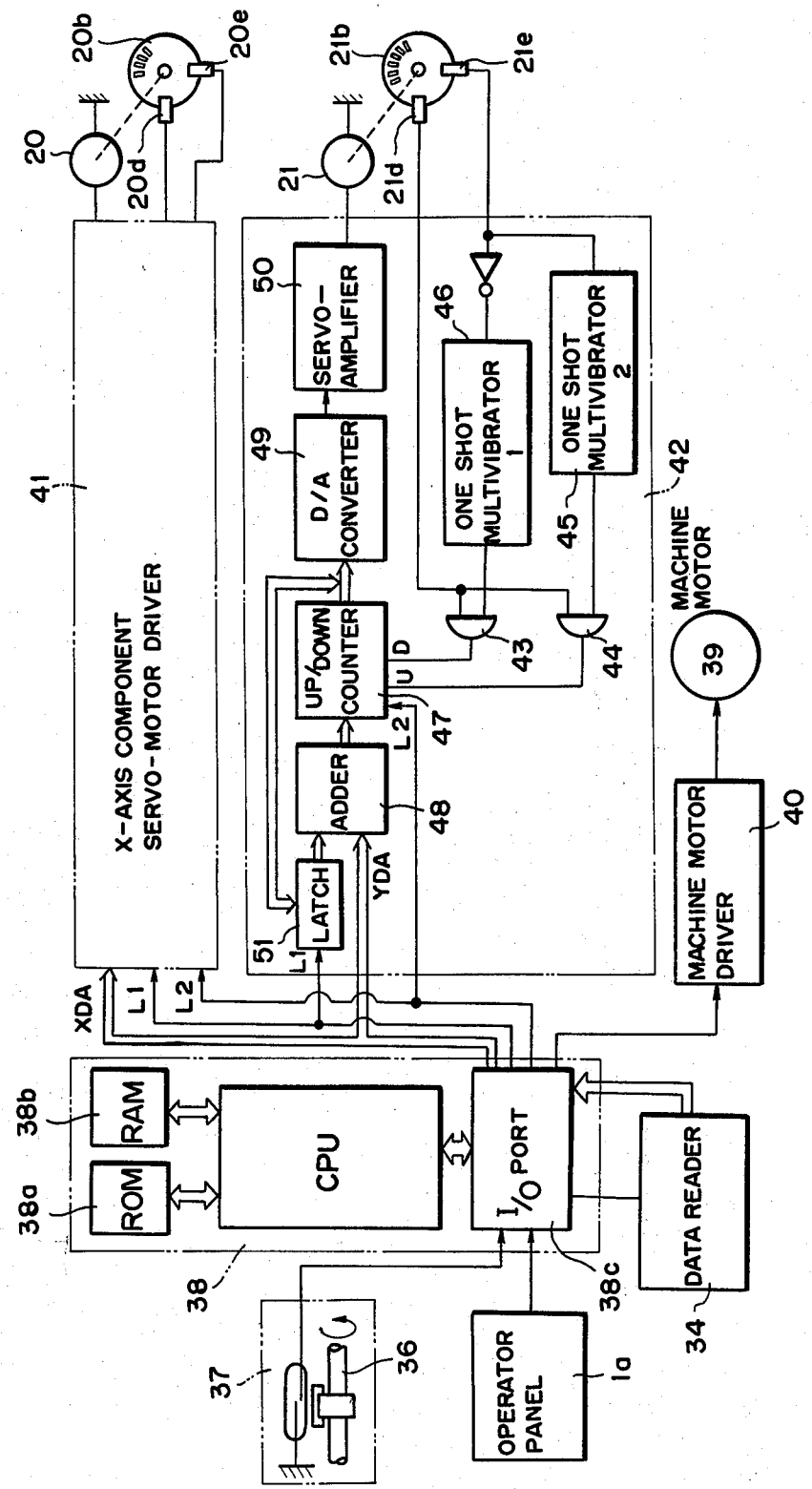
FIG. 4 is a block diagram of an electronic control circuit according to one preferred embodiment of the present invention.
Figure 5:
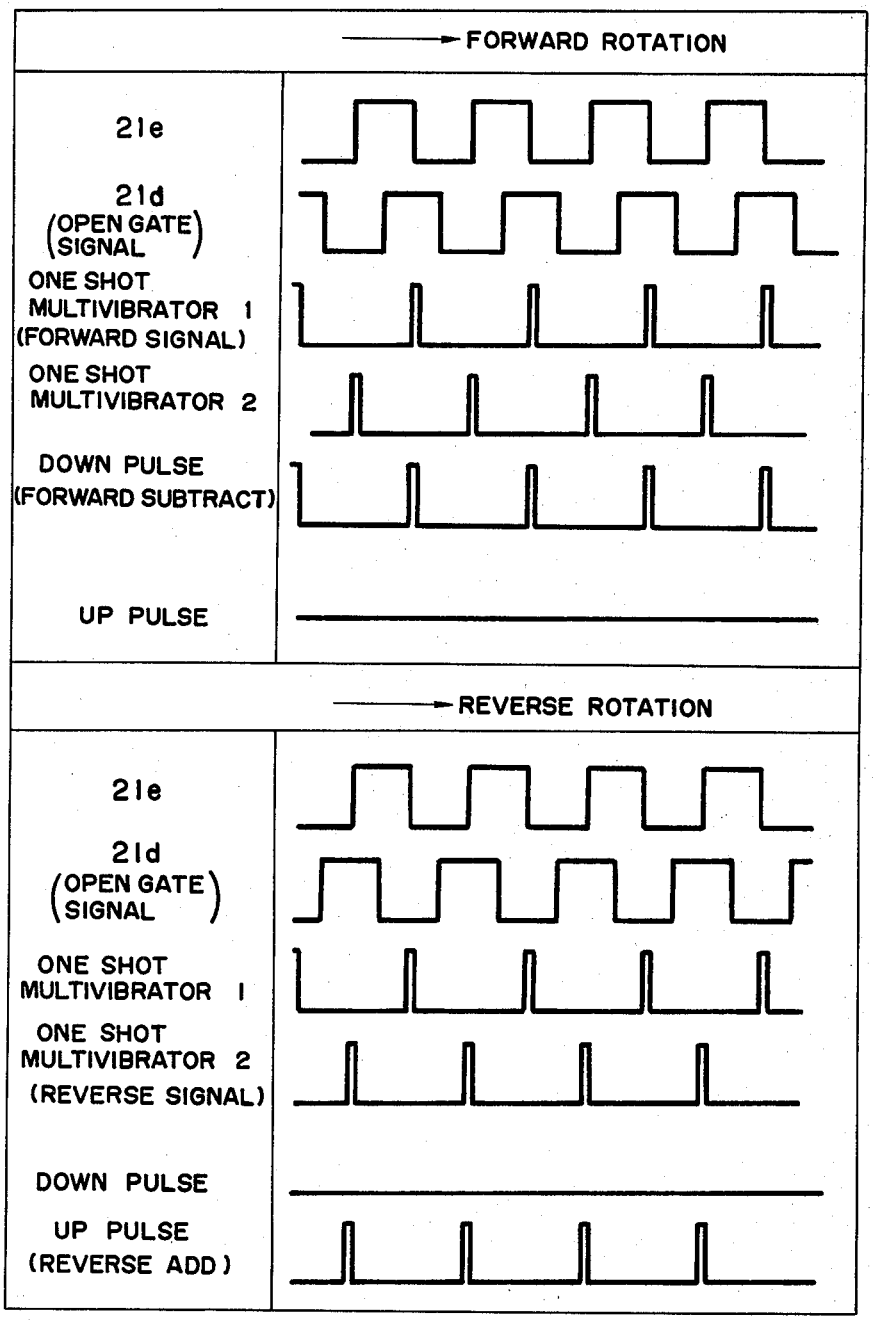
FIG. 5 is a pulse form diagram illustrating the operating characteristics of the principal circuit elements.

In the addition to the above-described automatic frame driving mechanism, the sewing machine 1 has the operator console 1a as briefly mentioned earlier. As shown schematically in FIG. 1, the console 1a contains a data reader 34 which permits programmed control data carried by appropriate data recording media such as magnetic tape memory cassette shown to be read into the memory, and controls 35a and 35b such as switches or keys for controlling the operation of the machine 1. In the interior of the machine 1, a synchronizing signal generator 37 is provided on a spindle 36 which drives the needle 2, and responds to the rotation of the spindle 36 for providing synchronized signal output. FIG. 4 illustrates the control circuit arrangement according to one preferred form of the present invention. As shown in FIG. 4, the control circuit includes a microcomputer 38 which contains a ROM (Read-Only-Memory) 38a in the form of a fixed memory storing logical and arithmetic operation programs to be executed by the microcomputer 38, and a RAM (Random-Access-Memory) 38b which sotres programmed automatic embroidery control data read through the data reader 34. The specific arrangement of the RAM 38b depends upon the type and other factors of the data recording media to be used with the data reader 34. One example is disclosed in the Japanese Patent Specification No. Showa 54-116962 filed in the name of the assignee of the right transferred from the present inventor. The above specification discloses the use of a similar magnetic tape memory to the one 33 described above, in which in order to save the main memory capacity, the data reader 34 is controlled to operate intermittently and the automatic embroidering operations are performed as if they are controlled on-line. The computer 38 responds to instructions provided from the operator switches 35a and 35b so that it can operate the machine drive motor 39 through the machine motor driver circuit 40. Also, the computer responds to the synchronized signals provided by the synchronizing signal generator 37 in synchronism with each rotation of the machine spindle 36, and transfers the embroidery frame drive data for each stitch operation sequentially from RAM 38b to the x-axis travel component servomotor driver circuit 41 and y-axis travel component servomotor driver circuit 42. Simultaneously, two load signals $L_1$ and $L_2$, which are synchronized with the respective output timing of the frame drive data XDA and YDA for the x-axis and y-axis travel components, are delivered from the I/O port 38c of the computer 38 to the respective servomotor driver circuits 41 and 42. However, note that one of the load signals precedes slightly the output timing and the other signal immediately follows the output timing. In the embodied form of the present invention, the two servomotors are employed as described above, and the code discs 20b and 21b are fixed to the respective output shafts of the servomotors. The sensor pairs each consists of two sensors which respond to each rotation of the code discs to provide two output detect signals 90° out of phase. The two output detect signals serve as feedback control signals for controlling the servomotors 20 and 21. If the servomotors rotate incompletely with respect to the contolled (ordered) amount of rotation as required by the feedback signals, then the residual or uncompleted portion of the required amount of rotation is added to the frame drive data XDA, YDA for the next succeeding stitch operation. Thus, control signals representing corrected values are provided. This process avoids the integral accumulation of errors in the succeeding stitch operations, which is the essential feature of the present invention. To this end, the two servomotor driver circuits 41 and 42 are provided. The driver circuits 41 and 42 are shown as separate from each other for the convenience of illustration, but actually the two elements should be included in a single circuit assembly. The two servomotor driver circuits have the identical arrangement and operation. Therefore, for clarity and ease of understanding, the following description is limited to the servomotor driver circuit 42 for the y-axis travel component, but it should be understood that the description also applies to the other servomotor driver circuit 41 for the x-axis travel component. Referring now to FIG. 5, the description begins with the feedback circuit portion. As shown, one sensor 21d in one pair provides a detect signal which is fed as an open gate signal to a pair of AND gates 43 and 44. A one-shot multivibrator 45 is connected to the output of the other sensor 21e, and is actuated at a rising time of the detect signal output of the sensor 21e to provide a pulse whose timing is synchronized with the above rising timing. Another one-shot multivibrator 46 is also connected to the output of the sensor 21e and is responsive to the falling time of the same detect signal to provide a pulse synchronized with the detect output. The two output pulses of the multivibration are connected to the respective AND gates 43 and 44. It is assumed that if the detect signal provided by the sensor 21e precedes the open gate signal supplied by the sensor 21d, it represents the forward rotation of the servomotor 21. Then, the AND gate 43 responds to the output of the multivibrator 45 to provide the number of pulses synchronized with that output which represents the corresponding angle of forward rotation of the servomotor 21. If the detect signal represents the reverse rotation, the AND gate 44 provides the numbers of pulses which represents the corresponding angle of reverse rotation. The output of the AND gate 43 is connected to a Down input terminal D of an Up/Down counter 47, and the output of the AND gate 44 is connected to an Up input terminal U.

A second load signal $L_2$ immediately following the frame drive data YDA is fed into the Up/Down counter through its preceding adder 48, and responds to the output of the adder 48 and contains a value preset according to the output content of the adder 48. Then, the content indicative of positive or negative y-axis component rotation angle in the Up/Down counter 47 is connected to a next stage D/A converter 49 which provides a positive or negative polarity voltage output, which is then fed to the input terminal of a servo-amplifier 50. Thus, the servomotor 21 responds to the output of the servo-amplifier 50 to rotate according to the amplifier output. This rotation causes a feedback pulse which represents the corresponding forward or reverse rotation to be delivered to the Up/Down counter 47 which counts down if the input indicates a forward rotation as compared with the preset value and counts up if the input indicates a reverse rotation. As a result of the counting up or down, the counter 47 provides an output indicative of a value counted towards making zero, i.e. mostly of nearly zero.

The output of the Up/Down counter 47 is also connected to a latch circuit 51 whose output is further connected to one input terminal of the adder 48. The other input of the adder 48 is the aforementioned frame drive data YDA. The latch circuit 51 is actuated by the first load signal $L_1$ of the Up/Down counter 47 whose input timing is slightly earlier than the frame drive data YDA for the next succeeding stitch operation.

The following provides a summary of the operation of the above-described circuit arrangement which operated to avoid the accumulation of the error occurrences when the servomotor 21 provides an incomplete servo operation. If the torque of the servomotor 21 is decreasing near the end of the servomotor operation for one stitch, causing the servomotor to come to rest with the incomplete servo operation balanced with the load, the Up/Down counter 47 also becomes inactive without bringing its preset value back to nearly zero. In this condition of the counter 47, the machine spindle 36 continues with rotation, and at a next timing when the computer 38 is supplying a frame drive data YDA for the next stitch operation, the first load signal $L_1$ causes the residual value in the Up/Down counter 47 to be read into the latch circuit 51. Then, the frame drive data YDA provided by the I/O port 38c is fed to the adder 48 which will contain a corrected data value to be obtained by adding or subtracting the content of the latch circuit 51 to or from the value of the input frame drive data YDA for that stitch operation accroding to the positive or negative value of the latch content. A new stitch control data which represents a corrected value obtained by correcting the error caused in the preceding stitch operation is transferred under control of the immediately following second load signal $L_2$ into the Up/Down counter 47. The Up/Down counter 47 then provides the newly corrected set value to the D/A converter 49 from which the new value is fed to the servo-amplifier 50. With the rotation of the servomotor 21 driven by the servoamplifier 50, feedback signal pulses are provided which represent the angle of rotation according to the sense of the rotation. If the feedback signal pulse represents a forward rotation, it is applied to the AND gate 43 for subtraction, and the feedback signal pulse represents a reverse rotation, it is applied to the AND gate 44 for addition. The output of the AND gate 43 or 44 actuates the Up/Down counter 47 to count up or down its content towards making the result zero. If the servomotor 21 comes to rest with the counter 47 containing non-zero value, the abovedescribed operations are repeated, whereon the value in the counter is counted up or counted down towards making the result zero to eliminate the errors otherwise to be accumulated.

If the servo operation provided by the servomotors 20 and 21 apparently supplies an insufficient or incomplete torque and the sewing machine continues to operate in this condition, the pattern drawn by those embroidering operations appears to be slightly more shrunk than the desired original pattern, but is yet analoguous to the original pattern. If errors occur partially or temporarily during the entire embroidering needle work process, the thus embroidered pattern can be copied to the exact size of the original pattern, and any disorder existing in the stitches is agreeably so unnoticeable that there is no problem in the practical use of the product.

As readily understood from the foregoing description in one preferred embodiment of the present invention, economical D.C. servomotors of a relatively small-size but great power output, are employed as a frame driving power supply, and is driven by the servomotor driver circuit. A feedback control loop is also provided in which when an error occurs in the malfunctioning servomotors, the error is counted up or down in the Up/Down counter to be included in a control data for a next subsequent stitch operation provided by the machine. Thus, even if the servo-operation provided by the servomotors is incomplete, the resultant error can be recovered or at least reduced so that subsequent errors cannot be accumulated for further subsequent stitch operations. Therefore, regardless of variations in the type and thickness of materials chosen for the fabric to be needleworked and also regardless of possible variations in the load caused by other variable factors, the embroidering control operations can reliably be performed to permit an exact reproduction of the original pattern without any deviation from the desired pattern.

Figure 6:
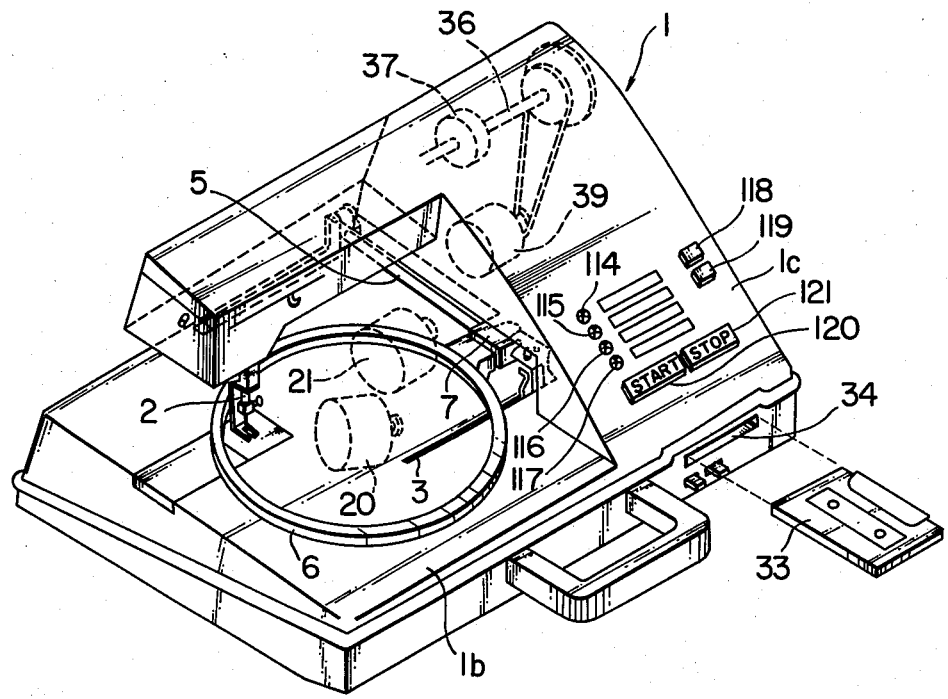
FIG. 6 is a perspective view of an automatic embroidery sewing machine incorporating another preferred form of the control system according to the present invention.

In another preferred embodiment of the present invention shown in FIG. 6, the interior of the bed 1b of the sewing machine 1 contains an x-axis drive servomotor 20 and a y-axis drive servomotor 21, both the servomotors providing drive power sources which cause a frame 6 carrying a fabric to be embroidered to travel to draw a plan pattern locus produced according to the original pattern. A traveller 7 is driven by a corresponding drive wire suspension machanism (not shown) so that the traveller 7 can travel along the y-axis guide rod 5 accroding to a given y-axis component of the resultant motion, and the y-axis guide rod 5 is driven by a corresponding drive wire suspension mechanism (not shown), causing the y-axis guide rod 5 to move along the length of a slit 3 according to a given x-axis component of the resultant motion. The resultant motion of the y-axis and x-axis components forms a plane pattern motion path along which the embroidering frame 6 carried by the traveller 7 is to travel. The mechanism of the servomotors for causing a resultant motion composed of the two components in the x- and y- coordinates is the same as described in the earlier preferred embodiment. A needle (2) driving spindle 36, which is driven by a machine drive motor 39 located within the machine bed compartment 1b carries a synchronizing signal generator 37 which provides synchronizing signals synchronized with up and down movement of the needle 2. The two servomotors 20 and 21 start up in response to the synchronized signal timings so that they can cause the fabric held by the frame 6 to travel for each stitch operation. The front right-hand face of the machine 1 has an operator panel or console 1c in the interior of which a control circuit is provided. The control circuitry includes a memory for storing programmed embroidering control data read out by a data reader 34 below the console 1c from appropriate data recording media 33 such as magnetic tape, and a control circuit providing sequential control functions to permit the two servomotors 20 and 21 to be operated intermittently in synchronism with the rotation of the machine spindle 36 and also provides driving control facilities which cause the machine motor 39 to be driven in the same manner. The console 1c contains a plurality of indicators 114, 115, 116 and 117 and control keys 118, 119, 120 and 121.

Figure 7:
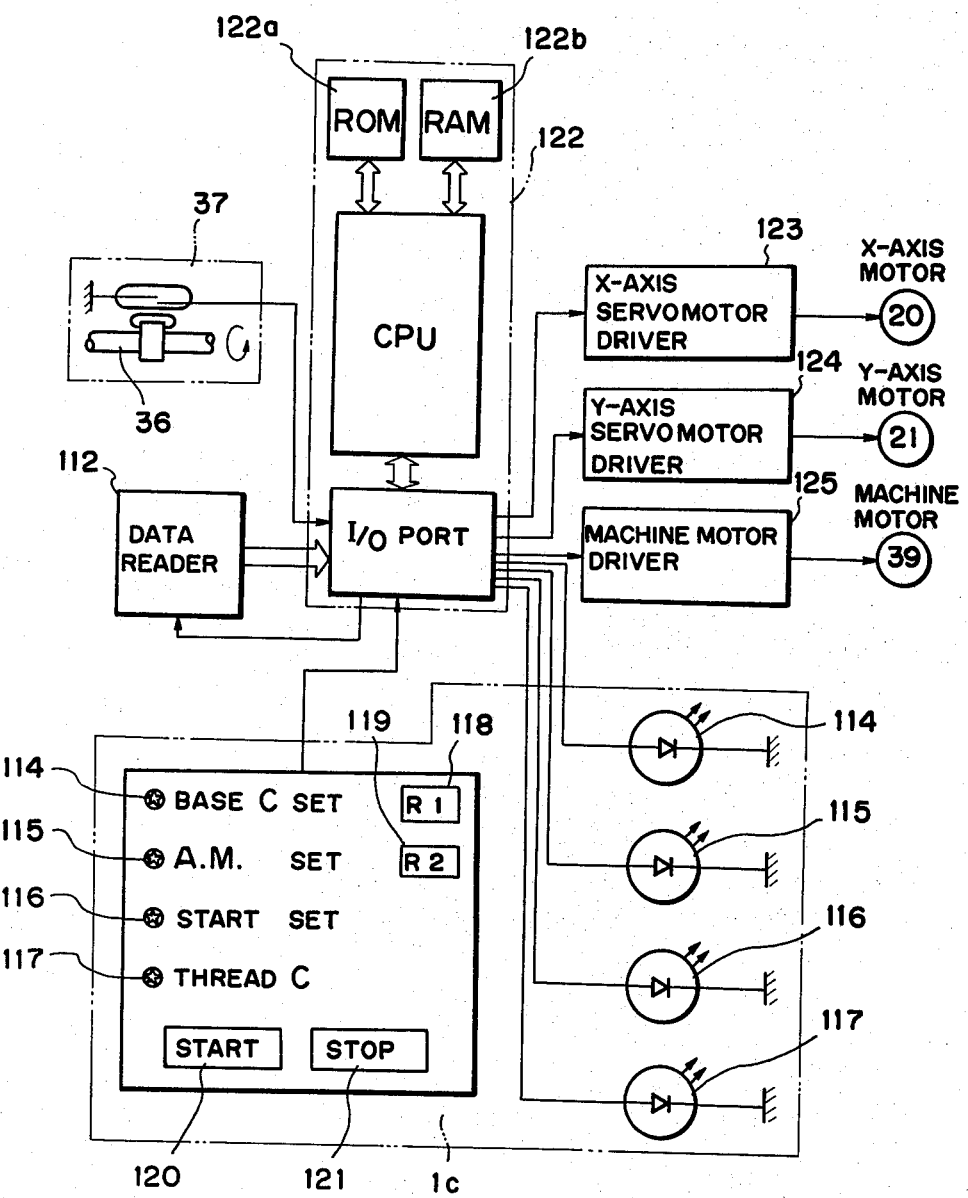
FIG. 7 is a block diagram of the circuit arrangement of FIG. 6.
Figure 9:
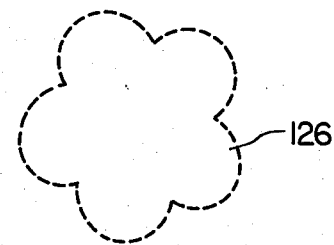
FIGS. 9 through 12 illustrate the sequence of the embroidering operations perfomed according to the present invention.
Figure 10:
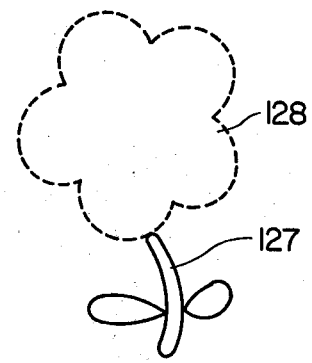
Figure 11:
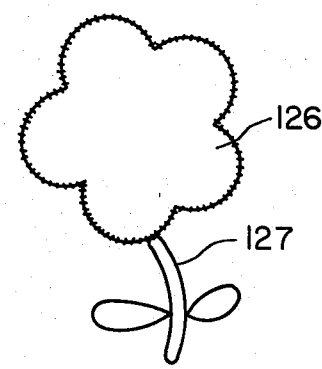
Figure 12:
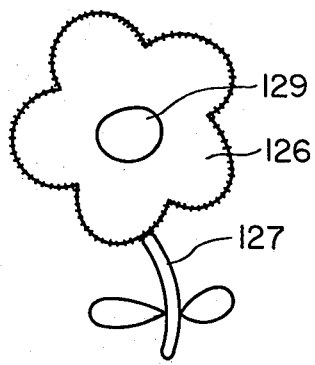

Referring then to FIG. 7, the arrangement of the abovementioned control circuitry is described in details. A computer system 122 usually known as microcomputer provides control signals which are applied to the respective servomotor 20, 21 driver circuits 123 and 124 and to the machine motor 39 driver circuit 125, and also controls the indicators 114 to 117. The computer system 122 contains a fixed ROM (Read-Only-Memory) 122a which stores data processing and arithmetic operation programs to be performed by the computer, and a RAM (Random-Access-Memory) 122b which stores programmed automatic embroidering control data read out through the data reader 34. The computer 122 responds to the respective actions of the control keys 114 to 117, causing the machine drive motor 39 to be driven, and also responds to the syncronized signals provided by the synchronizing signal generator 37 in synchronism with the rotation of the machine spindle 36 such that it reads a frame drive data for each stitch operation sequentially from the RAM 122b. The frame drive data read out is delivered to the respective servomotor driver circuits, which provides drive control signals for causing the corresponding servomotors 20 and 21 to rotate under the control of the driver circuits. As the frame drive control operation proceeds in the above manner, the control data read out from the RAM 122b turns on the appropriate indicators 114–117 at the completion of each outline sewing operation, or at the completion of the embroidery needlework or at times of changing threads during the above needlework operations. Turning on any of the indicators always stops the operation of the machine 1. The control data which permits the indicators to turn on and the machine 1 to stop is previously programmed in the frame drive control data program. The chart of FIG. 9 presents an example of the control data programs. In this case, the computer 122 logically interprets the contents of the control data based on hexadecimal 2-digit coded values, and, if the value is HEX[8A], instructs the operator to set a fabric on the frame 6 or replace the current fabric with a new one. If the computer detects HEX[85] during the embroidering process, it provides a control signal indicating the time to change threads. If the value detected is HEX[88], it provides a control signal indicating that an appliqué pattern needlework should be started. With HEX[8B] detected, the computer provides a control signal indicating that an appliqué pattern cloth should be placed in the frame 2. In response to those control signals, the appropriate indicators turn on, telling the operator to take the corresponding actions. The control programs are written such that if HEX[8A] code representing cloth setting is read at the completion of the appliqué pattern cloth outline sewing operation since it started with the HEX[8B] code, causing the appropriate indicator to turn on and the machine to come to rest, then depressing a single repetition key 118 causes the computer to branch back to reading HEX [8B] code. Similarly, the control program codes are structured such that if one appliqué needlework is completed since it started with HEX [8A] code, causing the machine to come to rest, and if it is then desired to start with setting an embroidering cloth, depressing another repetition key 119 causes the computer to return to HEX [8A] code in the programs. The remaining control keys 120 and 121 are used for causing the machine operation to stop temporarily and for causing the machine operation to restart, respectively. The right-hand column in FIG. 8 shows how the needlework operations proceed in accordnace with the programmed control codes. The operation starts with setting an appliqué pattern cloth to the frame as indicated by HEX [8B] code. Starting with HEX [8B] code and proceeding through the codes [EO] to [05], the outline needle work for the cutout pattern prepared as shown in FIG. 4 is completed. Then, HEX [8A] code reading causes the machine operation to stop. During the machine rest, the previous cloth on the frame 2 is replaced by a new one and the cutout pattern 126 is manually cut along the pattern outline by means of scissors or like. Thereafter, the machine operation is resumed and the embroidering needlework proceeds in accordance with the embroidering programs to provide an embroidered pattern on the cloth ground (under-fabric). Subsequently, it proceeds with sewing the outline 128 along which the prepared appliqué pattern cloth is to be attached to the cloth ground. Upon completion of the above step, HEX [88] is next read, indicating the appliqué cloth setting and causing the machine to stop. As instructed by the HEX [88] code, the cutout pattern 126 is placed on the sewn outline 128 to have its outline overlapped on the sewn outline 128 on the cloth ground. Then, resuming the machine operation causes the pattern sewing operation to be performed as shown in FIG. 6. When this operation is completed, HEX [85] code causes the machine to stop, allowing a thread change. In this case, a different color thread presenting a flower core is selected. After completion of the thread change, the machine is resumed, permitting the subsequent needlework steps to proceed. At the end of the flower core (129) embroidering process, one complete set of programs is completed, causing the machine to come to rest. If the above operations are desired to be repeated, depressing the repeation key 118 can cause the program set to return to its start.

In the automatic embroidering sewing machine which provides sequence control functions for permitting the embroidery frame to be driven in accordance with the programmed control data codes, the above-described embodiment of the present invention employs a sequence of control data codes which is programmed and organized into the embroidering operation control data program set. The appliqué pattern outline needlework and its sewing on the cloth ground are permitted in accordance with the above control data programs. At each step of the operations, the programs actuate the appropriate indicators corresponding to the next succeeding steps and cause the machine to stop. Thus, the operator can properly be led through the required operations. If certain steps of the operation are desired to be repeated, simply depressing the appropriate repetition keys permits the program to return to the corresponding codes thereof. This provides the operator with the possibilities of automatically and reliably returning to the steps as required. In the described embodiment, the indicators are provided in the form of indicator lights. Alternatively, audible alarm or buzzer to provide different tones or musical melodies may be employed to warn or remind the operator of the next action bo be taken.

Although the present invention has been described by way of the several preferred embodiments thereof, it should be understood that various changes and modifications may be made without departing from the spirit and scope of the invention.

We claim:

1. A control apparatus for embroidery sewing machine which sequentially reads out embroidery frame driving data of each stitch for embroidery sewing stored in a memory means, and actuates an embroidery frame-supporting/driving means in x- and y-axis directions synchronized with operation of a sewing machine through two controlled servomotors on each stitch, thereby controlling feed of a base cloth spanned on the embroidery frame stitchingly drawing a locus of a plane figure; wherein the improvement comprises:

two direct current servomotors as said two servomotors;
   means for producing a feed back pulse signal according to a rotation angle in a respective rotation sense by way of coding each rotation sense and angle of each servomotor output shaft;
   an up/down counter which registers a preset x- or y-axis driving data through an adder, yields a servo control signal for each of said servomotors according to the preset data, and counts up or down toward making the preset data zero according to said feed back pulse signal resulting in a residual data if the servomotor is incompletely actuated;

means for correction by superposing said x- or y-axis driving data for a next stitch with the residual data by temporally memorizing the residual data slightly preceding a timing whereat said x- or y-axis driving data for the next stitch is supplied from said memory means to said adder;

wherein integral accumulation of errors on incomplete actuation of each servomotor is capable of being eliminated or reduced.

2. A control apparatus as defined in claim 1, wherein said means for producing a feedback pulse signal according to a rotation angle in either of forward and reverse rotation senses includes one pair of sensor means disposed angularly with respect to each other on code disc means having a rotation synchronized with the respective servomotor output shafts, one sensor means in said one pair being responsive to rotation of said code disc means for providing an open gate signal output to be connected to one pair of AND gate means, and the other sensor means being synchronized with the rising timing of said open gate signal output for providing output to be connected to one AND gate means in said one pair through first one-shot multivibrator means actuated to provide pulse output and also being synchronized with the falling timing of said open gate signal output for providing output to be connected to the other AND gate means through second one-shot multivibrator means actuated to provide pulse output.

3. A control apparatus as defined in claim 2, wherein said one pair of said AND gate means is connected to an input of said up/down counter and provide output signals indicative of forward and reverse rotation of said respective servomotors for said up/down counter.

4. A control apparatus as defined in claim 3, wherein output of said AND gate means representing the corresponding forward rotation is connected to the down input terminal of said up/down counter.

5. A control apparatus as defined in claim 3, wherein output of said AND gate means representing the corresponding reverse rotation is connected to the up input terminal of said up/down counter.

6. A control apparatus as defined in claim 1, wherein output of said up/down counter is connected through said adder through latch circuit means, said latch circuit means being actuated by first load signal from said memory means slightly preceding the embroidery frame drive data.

7. A control apparatus as defined in claim 1 or 6, wherein said up/down counter contains a residual value for the preceding stitch operation, said residual value being transferred through said latch circuit means and said adder back to said up/down counter together with input of another embroidery frame drive data for the next succeeding stitch operation to be applied through an adder, whereby said up/down counter provides a corrected control data for said next succeeding stitch operation representing a new value obtained by superposing an error in said preceding stitch operation on the value for said next succeeding stitch operation.

8. A control apparatus as defined in claim 7, wherein the transfer of the superposed data from said adder is provided by second load signal immediately following the embroidery frame drive data for the next succeeding stitch operation.

9. A control apparatus as defined in claim 1, wherein said D.C. servomotors are controlled by respective individual servomotor driver circuit means actuated for x-axis and y-axis components, respectively on each stitch operation.

10. A control apparatus as defined in claim 2, wherein said one pair of said sensor means are arranged at substantially 90° with respect to each other about the central axis of said code disc means.

11. A control apparatus as defined in claim 2, wherein each of said code disc means is rotatably fixed to the respective servomotor output shafts.

12. A control apparatus for the embroidery sewing machine which sequentially reads out embroidery frame driving data for each embroidery sewing stitch operation stored in memory means, and actuates an embroidery frame-supporting/driving means in x- and y-axis directions synchronized with the operation of the sewing machine through two controlled servomotors on each stitch, thereby controlling the feed of a base fabric or cloth ground spanned on the embroidery frame stitchingly drawing a locus of a plane figure, wherein the improvement comprises:

computer means for controlling the operation and cloth feeding of the sewing machine in accordance with a sequence of programmed embroidery frame drive data stored in a memory means, said computer means logically interpreting the content of codes in said program sequence at each change from one code or step to another, and providing each corresponding indication output and simultaneously causing the machine operation to be arrested;

a plurality of indicator elements on the operator console of the sewing machine and responsive to said indication output of said computer means for being energized to inform the operator of a change in the steps; and a plurality of repetitive control keys on the operator console operable to return or advance said program sequence to any selected code or step therein.

13. A control apparatus as defined in claim 12, wherein said plurality of indicator elements include indicators which are energized in accordance with said embroidery control data program sequence for providing respective indications including at least outline sewing, embroidering sewing, and thread change when a change in said operation steps occurs from one step to another.

14. A control apparatus as defined in claim 13, wherein said plurality of indicator elements further include indicators telling changes to an appliqué attachment pattern cloth loading and to its sewing, respectively.

15. A control apparatus as defined in claim 14, wherein said indicators tell the operating state and the operation completion at each change to the appropriate step.

16. A control apparatus as defined in claim 12, wherein said repetitive control keys return the program sequence to the start thereof upon depression of said keys.

17. A control apparatus as defined in claim 12, wherein said repetitive control keys repeat or advance the program sequence from any selected code or step therein.

18. A control apparatus as defined in claim 12, wherein said repetitive control keys include a first control key for causing the program sequence to return to the start thereof, and a second control key for causing the program sequence to repeat or advance from any selected code or step therein.

* * * * *